(12) United States Patent
Kobayashi et al.

(10) Patent No.: US 6,556,834 B1
(45) Date of Patent: Apr. 29, 2003

(54) CDMA MOBILE TERMINAL APPARATUS

(75) Inventors: Shigeyuki Kobayashi, Sagamihara (JP); Masayuki Enoki, Hino (JP); Buntaro Sawa, Hachioji (JP); Katsumi Hirai, Inagi (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/533,766

(22) Filed: Mar. 23, 2000

Related U.S. Application Data (63) Continuation of application No. PCT/JP99/03957, filed on Jul. 23, 1999.

(30) Foreign Application Priority Data

Jul. 24, 1998 (JP) .......................................... 10-225466

(51) Int. Cl.$^7$ ................................................ H04Q 7/20
(52) U.S. Cl. ........................ 455/464; 455/450; 455/455; 370/431; 370/437
(58) Field of Search ................................ 455/450, 451, 455/452, 453, 455, 464; 370/320, 329, 335, 341, 431, 437, 468, 321, 328

(56) References Cited

U.S. PATENT DOCUMENTS

| | | | | |
|---|---|---|---|---|
| 5,355,516 A | * | 10/1994 | Herold et al. | 455/34.1 |
| 5,436,956 A | * | 7/1995 | Shiotsuki et al. | 379/60 |
| 5,673,259 A | * | 9/1997 | Quick, Jr. | 370/342 |
| 5,703,873 A | * | 12/1997 | Ojanpera et al. | 370/332 |
| 5,883,887 A | * | 3/1999 | Take et al. | 370/329 |
| 6,070,084 A | * | 5/2000 | Hamabe | 455/522 |
| 6,195,551 B1 | * | 2/2001 | Kim et al. | 455/436 |
| 6,256,301 B1 | * | 7/2001 | Tiedemann, Jr. et al. | 370/342 |

FOREIGN PATENT DOCUMENTS

| | | | |
|---|---|---|---|
| CN | 1206311 A | 1/1999 | |
| JP | 9-9331 | 1/1997 | |
| JP | 9-247085 | 9/1997 | |
| JP | 9-322222 | 12/1997 | |
| JP | 10-191419 | 7/1998 | |
| JP | 11-113042 | 4/1999 | ......... 455/439 |

* cited by examiner

*Primary Examiner*—Thanh Cong Le
*Assistant Examiner*—Tuan Tran
(74) *Attorney, Agent, or Firm*—Finnegan, Henderson, Farabow, Garrett & Dunner, L.L.P.

(57) ABSTRACT

In idle handover control, the reception quality of a synchronized pilot channel is classified into quality class "1" with which data can be received without any error, quality class "2" with which data can be received within an allowable error range, or quality class "3" with which data is difficult to receive with high quality, and different thresholds, i.e., 6 dB, 4 dB, and 2 dB, are respectively set for these quality classes. It is checked whether the reception quality of another pilot channel as a synchronization establishment candidate is higher than that of the synchronized pilot channel by a threshold corresponding to a quality class into which the synchronized pilot channel is classified or more. If it is determined that the reception quality of the synchronization establishment candidate is higher by the threshold or more, handover processing is performed. Otherwise, synchronization with the synchronized pilot channel is maintained without handover processing.

19 Claims, 5 Drawing Sheets

CDMA MOBILE TERMINAL APPARATUS

CROSS-REFERENCE TO RELATED APPLICATIONS

This is a Continuation of Application PCT/JP99/03957, filed Jul. 23, 1999.

This application is based upon and claims the benefit of priority from the prior Japanese Patent Application No. 10-225466, filed Jul. 24, 1998, the entire contents of which are incorporated herein by reference.

BACKGROUND OF THE INVENTION

The present invention relates to a mobile terminal apparatus used in, for example, a cellular radio communication system and, more particularly, to a mobile terminal apparatus using CDMA (Code Division Multiple Access) as a radio access scheme.

Recently, a mobile communication system using CDMA has attracted attention.

A CDMA mobile communication system uses spread spectrum communication and communicates, for example, as follows. A communication apparatus on the transmitting side modulates digital speech data or image data by digital modulation such as PSK modulation. The apparatus then converts the modulated data into a wideband baseband signal by using a spreading code. The apparatus converts the spread transmission signal into a signal having a radio frequency, and transmits it. A communication apparatus on the receiving side despreads the received radio frequency signal by using a code identical to the spreading code used by the communication apparatus on the transmitting side. This apparatus digitally demodulates the reception signal after this despreading by digital demodulation such as PSK demodulation, thereby reconstructing reception data.

CDMA has, for example, the following advantages which neither FDMA (Frequency Division Multiple Access) nor TDMA (Time Division Multiple Access) has:

(1) The use of a spread spectrum technique makes it possible to maintain high communication quality with respect to changes in communication environment such as fading.

(2) The use of a RAKE reception scheme makes it possible to perform soft handover and realize stable handover without causing any short break.

(3) Since many users share one radio frequency signal, a high frequency utilization efficiency can be attained.

In a CDMA mobile terminal apparatus, however, power consumption is generally high, and the battery life is short as compared with a mobile terminal apparatus using FDMA or TDMA.

In a cellular radio communication system, so-called handover is performed to switch one radio channel to another radio channel with which synchronization is to be established upon movement of a mobile terminal apparatus. In the handover, the mobile terminal apparatus detects the reception quality of a signal arriving from a base station, and determines on the basis of the detection result whether to perform switching. When the above reception quality is to be detected, a mobile terminal apparatus using FDMA or TDMA detects the reception electric field strength of a radio signal arriving from a base station. In contrast to this, a mobile terminal apparatus using CDMA must demodulate a radio signal arriving from a base station into a baseband signal first, and then perform digital processing for the signal. This is because, many mobile terminal apparatuses share one radio frequency (carrier) in CDMA, and digital signal processing including despreading processing for a spreading code must be performed to separate the respective channels.

For this reason, in the CDMA mobile terminal apparatus, many circuits in the reception system as well as the radio receiver operate in handover. As a consequence, a large current is consumed by the reception system.

In addition, in the CDMA mobile terminal apparatus, in the handover, the reception quality of a synchronized channel is compared with the reception qualities of other channels as synchronization establishment candidates to determine whether there is any channel whose reception quality is higher than that of the synchronized channel by a predetermined threshold or more. If a channel as a synchronization establishment candidate that meets this condition is found, the synchronized channel is switched to the channel of the synchronization establishment candidate.

In a conventional CDMA mobile terminal apparatus, however, the threshold for determining the reception quality is fixed to a predetermined value regardless of the reception quality of a synchronized channel. Even if, therefore, the reception quality of a synchronized channel is relatively good, and handover is not essentially required, handover is unconditionally performed whenever a channel as a synchronization establishment candidate higher in reception quality than this synchronized channel is found. As a consequence, handover occurs frequently, and much power is consumed by the terminal apparatus every time handover is performed.

In addition, in the CDMA mobile terminal apparatus, every time handover is performed, the reception qualities of all neighboring channels associated with the new channel with which synchronization is established are measured. For this reason, great power is consumed for every handover. As a result, the continuous standby time is greatly shortened.

BRIEF SUMMARY OF THE INVENTION

It is an object of the present invention to provide a CDMA mobile terminal apparatus which reduces power consumption by reducing unnecessary handover, thereby prolonging the battery life.

In order to achieve the above object, according to the first aspect of the present invention, there is provided a CDMA mobile terminal apparatus having a function of receiving signals respectively transmitted from a plurality of base stations, selecting an optimal signal from the signals, and establishing synchronization with the selected signal, characterized by comprising:

First detection means for detecting a reception quality of a first signal with which synchronization has been established, second detection means for detecting a reception quality of at least one second signal as a synchronization establishment candidate, means, having information representing a correspondence between the reception quality of the first signal and a plurality of threshold values which is set in advance to change in accordance with the reception quality, for obtaining, on the basis of the information, a threshold value corresponding to the reception quality of the first signal which is detected by the first detection means, determination means for determining whether the reception quality of the second signal, detected by the second detection means, is higher than the reception quality of the first signal, detected by the first detection means, by not less than the obtained threshold value, and switching control means for performing processing for switching a synchronization establishment target signal from the first signal to the second signal only when the determination means determines that the reception quality of the second signal is higher than the reception quality of the first signal by not less than the obtained threshold value.

The second aspect of the present invention is characterized by comprising first detection means for detecting a reception quality of a first signal with which synchronization has been established, second detection means for detecting a reception quality of at least one second signal as a synchronization establishment candidate, quality classification means for classifying the reception quality of the first signal, detected by the first detection means, according to a plurality of different predetermined quality classes, a memory for storing predetermined threshold values in correspondence with the respective quality classes, selection means for selecting a threshold value corresponding to the reception quality of the first signal, detected by the first detection means, from the memory, determination means for determining whether the reception quality of the second signal, detected by the second detection means, is higher than the reception quality of the first signal, detected by the first detection means, by not less than the threshold value selected by the selection means, and switching control means for performing processing for switching a synchronization establishment target from the first signal to the second signal only when the determination means determines that the reception quality of the second signal is higher than the reception quality of the first signal by not less than the selected threshold value.

According to the first and second aspects of the present invention, different determination conditions are set in accordance with the reception quality of the first signal with which synchronization is being established, and the necessity for handover is determined on the basis of the determination condition.

If, for example, the reception quality of the first signal with which synchronization is being established is so high that reception can be performed without any error, the necessity to perform handover from the first signal to another signal is low. For this reason, no handover is performed unless a second signal sufficiently higher in reception quality than the first signal is detected.

In contrast to this, if the reception quality of the first signal with which synchronization is being established is too low to be allowed, it is necessary to perform handover from the first signal to another signal. For this reason, if a second signal higher in reception quality than the first signal is available, handover to the second signal is performed regardless of how much higher the second signal is in reception quality.

With this arrangement, if the necessity for handover is low, handover is not easily performed. This reduces the power consumption upon handover, and hence makes it possible to prolong the battery life. In contrast to this, if the necessity for handover is high, handover is easily performed. This makes it possible to maintain high-quality communication.

In addition, according to another characteristic feature of the first and second aspects of the present invention, if there are a plurality of second signals as synchronization establishment candidates, some signals are selected from the plurality of second signals, and the reception qualities of only the selected signals are detected.

With this arrangement, signals as reception quality detection targets are thinned out. Therefore, the power consumption required for reception quality detection processing can be reduced as compared with the case wherein the reception qualities of all signals are always detected. This makes it possible to prolong the battery life.

Furthermore, history information about the reception quality of each of a plurality of second signals as synchronization establishment candidates is managed. In thinning out the second signals, signals with high possibilities of providing good reception qualities in the future are selected on the basis of the above history information.

With this arrangement, the reception qualities of signals as promising synchronization establishment candidates can be detected. Therefore, although the reception qualities of only some signals are detected, this makes it possible to reduce the possibility of the inconvenience of missing a signal with a high reception quality.

In order to achieve the above object, a mobile terminal apparatus according to the third aspect of the present invention has the following arrangement.

Immediately after handover from the first signal to the second signal, the reception quality of the second signal with which synchronization has been newly established is very much likely to be high. For this reason, the necessity for handover from the second signal to another signal is low, and hence processing for checking the necessity for re-handover, i.e., re-maintenance processing, is generally unnecessary.

The present invention has been made in consideration of this point, and comprises a mode shift control means in addition to a handover control means. This mode shift control means omits the checking processing of determining the necessity to switch the synchronization establishment candidate from the second signal to another signal after synchronization is established with the second signal by the above handover processing.

With this arrangement, after handover is completed, the re-maintenance processing for a signal with which synchronization is established by the handover processing is omitted, and the mobile terminal apparatus directly shifts to the intermittent reception mode. This makes it possible to reduce the power consumption as compared with the case wherein re-maintenance processing is unconditionally executed after handover. Hence, the battery life can be prolonged.

According to the third aspect of the present invention, in the mode shift control means, after synchronization is established with the second signal by the handover control means, it is determined whether the reception quality of the second signal, detected by the quality detection means, is equal to or higher than a predetermined value. If it is determined that the reception quality of the second signal is equal to or higher than the predetermined value, the re-maintenance processing for the second signal is omitted, and a shift to the intermittent reception mode is made. In contrast to this, if it is determined that the reception quality of the second signal is less than the predetermined value, the above re-maintenance processing is executed for the second signal.

With this arrangement, even immediately after handover, if the reception quality of the second signal, with which synchronization has been newly established, has deteriorated, re-maintenance processing for the second signal is performed. If, therefore, re-handover from the second signal to another signal is required, handover can be immediately executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Several embodiments of the present invention will be described with reference to the views of the accompanying drawing.

(First Embodiment)

Figure 1:
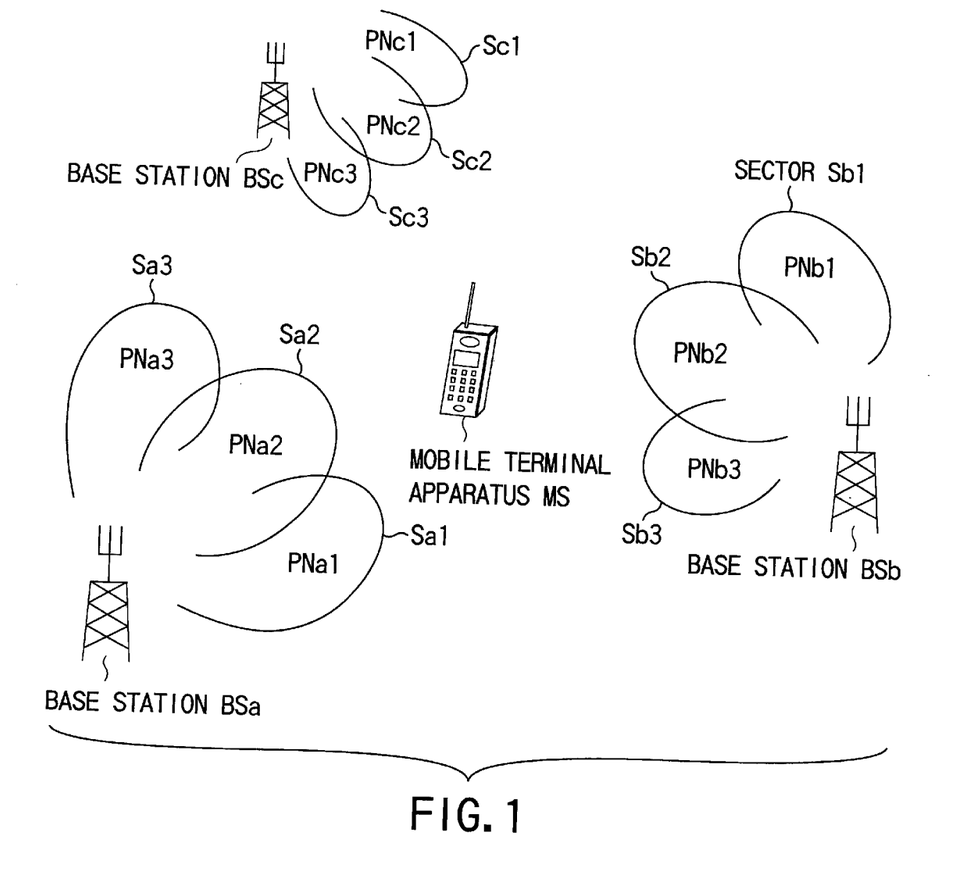
FIG. 1 is a schematic view showing the first embodiment of a CDMA mobile communication system according to the present invention.

FIG. 1 is a schematic view showing the first embodiment of a CDMA mobile communication system according to the present invention.

A plurality of base stations (FIG. 1 shows only three stations BSa, BSb, and BSc) are distributed in the service area of this system. These base stations BSa, BSb, and BSc respectively form cells. These cells are divided into a plurality of sectors (FIG. 1 shows three sectors for each cell: sectors Sa1, Sa2, and Sa3, sectors Sb1, Sb2, and Sbc, and sectors Sc1, Sc2, and Sc3). Spreading codes are respectively assigned to these sectors Sa1, Sa2, Sa3, Sb1, Sb2, Sb3, Sc1, Sc2, and Sc3. These spreading codes have different offset values. The respective base stations BSa, BSb, and BSc broadcast pilot channels PNa1, PNa2, PNa3, PNb1, PNb2, PNb3, PNc1, PNc2, and PNc3 by using the above spreading codes respectively assigned to the sectors Sa1, Sa2, Sa3, Sb1, Sb2, Sb3, Sc1, Sc2, and Sc3.

Note that as a spreading code, for example, a code generated by combining a PN code (Pseudo Noise code) and orthogonal code is used. The orthogonal code is used to suppress interference by increasing the orthogonality between channels. As an orthogonal code, a Walsh sequence or Orthogonal Gold sequence is available.

A mobile terminal apparatus MS performs communication by establishing synchronization with one of the pilot channels PNa1, PNa2, PNa3, PNb1, PNb2, PNb3, PNc1, PNc2, and PNc3 broadcast by the base stations BSa, BSb, and BSc. In this case, in order to perform high-quality communication, synchronization must be established with a pilot channel with high reception quality. For this purpose, the mobile terminal apparatus MS performs idle handover during standby.

In idle handover, the mobile terminal apparatus MS periodically detects the reception quality of a synchronized pilot channel and the reception qualities of other pilot channels as synchronization establishment candidates and compares them while performing intermittent receiving operation during standby. If the mobile terminal apparatus MS finds one of the pilot channels as the synchronization establishment candidates which is higher in reception quality than the synchronized pilot channel, the apparatus switches the synchronization establishment candidate to this pilot channel.

The mobile terminal apparatus MS of this embodiment determines the necessity of this idle handover by a unique scheme.

Figure 2:
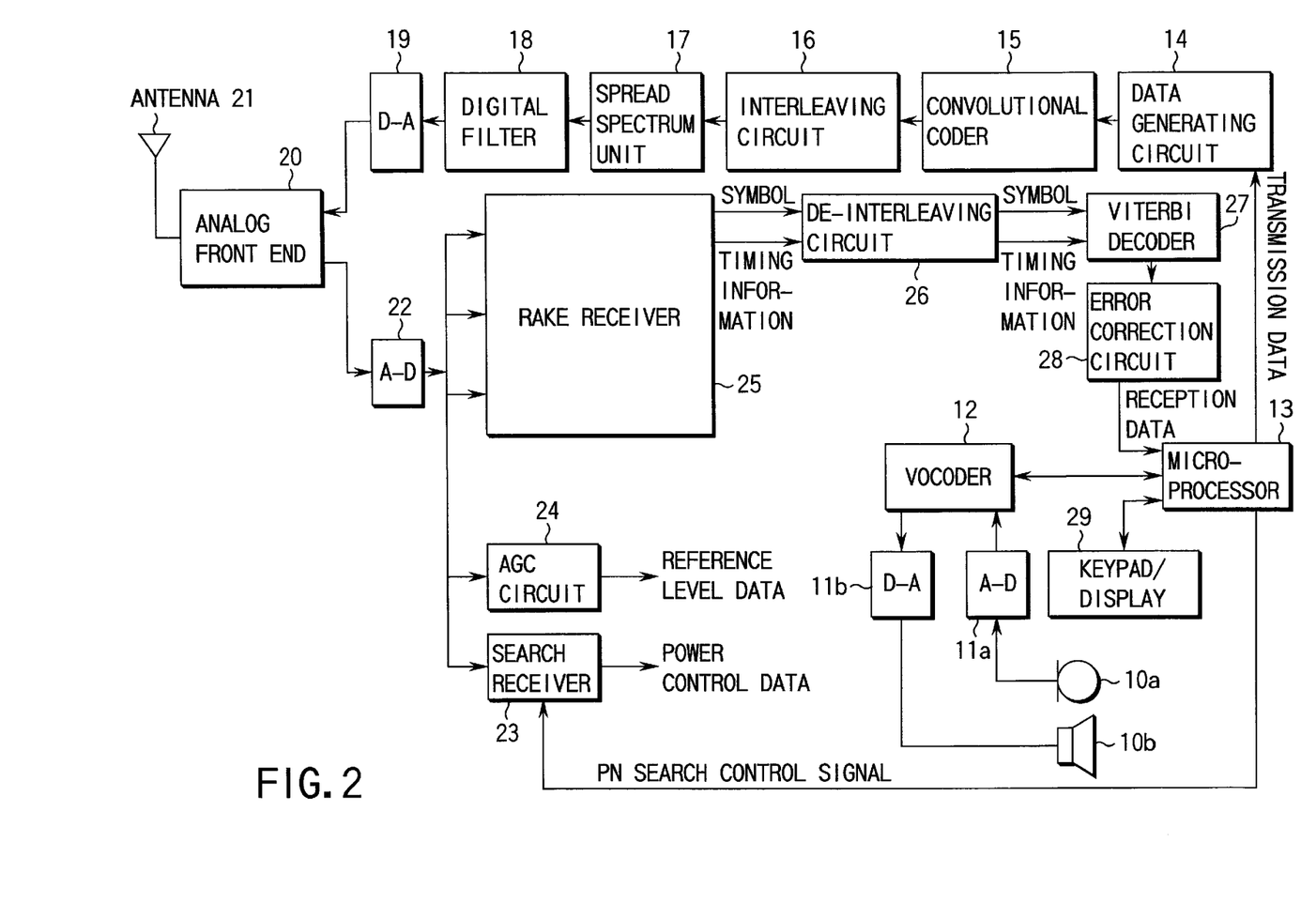
FIG. 2 is a block diagram showing the arrangement of a mobile terminal apparatus according to the first embodiment.

FIG. 2 is a block diagram showing the arrangement of the mobile terminal apparatus MS according to this embodiment.

Referring to FIG. 2, a transmission speech signal of a speaker which is output from a microphone 10a is converted into a digital signal by an analog-digital converter (A-D) 11a. This signal is input to a voice coder-decoder (to be referred to as a vocoder hereinafter) 12. The vocoder 12 uses variable rate speech coding. For example, the vocoder 12 selects one of four different coding rates, i.e., 9,600 bps, 4,800 bps, 2,400 bps, and 1,200 bps, and codes the input digital speech signal at the selected coding rate. The coding rate is designated by a microprocessor (MPU) 13.

The microprocessor (MPU) 13 adds a control signal and the like to the coded digital speech signal output from the vocoder 12 to generate transmission data. A data generating circuit 14 adds an error detection code and error correction code to this transmission data. A convolutional coder 15 codes the resultant data. This coded transmission data is subjected to processing for interleaving in an interleaving circuit 16. A spread spectrum unit 17 spreads the transmission data output from the interleaving circuit 16 into a wideband signal by using a spreading code.

A digital filter 18 removes unnecessary frequency components from this spread-spectrum transmission signal. A digital-analog converter (D-A) 19 then converts the resultant signal into an analog transmission signal. This analog transmission signal is up-converted first to a predetermined radio frequency by an analog front end 20 and then controlled to a predetermined transmission power level. Thereafter, the signal is transmitted from an antenna 21 to the base station.

A spread-spectrum radio signal received by the antenna 21 is amplified first by a low-noise amplifier in the analog front end 20 and then down-converted to an intermediate frequency or baseband frequency. The reception signal output from the analog front end 20 is converted into a digital signal by an analog-digital converter (A-D) 22 at a predetermined sampling cycle. This digital signal is then input to a search receiver 23, automatic gain control (AGC) circuit 24, and RAKE receiver 25.

The RAKE receiver 25 has three finger circuits and a symbol synthesizer for symbol-synthesizing output signals from the finger circuits. The respective finger circuits despread the reception signals from desired paths with high reception levels to separate the reception signals from the three different paths from the multipath radio signal and reconstruct the respective data.

The search receiver 23 serves to search a spreading code on a pilot channel broadcast from a base station for the offset of the code, and has the same basic arrangement as that of a finger circuit. The reception quality data and power control data obtained by this spreading code search operation are loaded into the microprocessor 13.

A demodulated symbol output from the RAKE receiver 25 is input to a de-interleaving circuit 26. The de-interleaving circuit 26 performs de-interleaving processing for the symbol. The demodulated symbol after this de-interleaving is Viterbi-decoded by a Viterbi decoder 27. The demodulated symbol after this Viterbi decoding is further subjected to error correction decoding in an error correction circuit 28 to become reception data. This data is input to the microprocessor 13.

The microprocessor 13 separates the input reception data into speech data and control data. Of these data, the speech data is speech-decoded by the vocoder 12 and converted into an analog signal by a digital-analog converter (D-A) 11b. The resultant signal is audibly output from a loudspeaker 10b.

Note that a keypad/display 29 is used to allow a user to input and set dial data, control data, and the like and to display various pieces of information about the operation state of the mobile terminal apparatus MS. The operation of the keypad/display 29 is controlled by the microprocessor 13.

The microprocessor 13 has an idle handover control function as well as the general control function for communication line connection control accompanied by originating and terminating operations, communication control, and the like.

This idle handover function is used to detect the reception quality of a synchronized pilot channel and classify it according to three difference quality classes. In this case, for the idle handover function, different thresholds are respectively prepared for the above three quality classes. This function subtracts the reception quality detection value (first value) of the synchronized pilot channel from the reception quality detection value (second value) of another pilot channel as a synchronization establishment candidate, and compares the difference value with a threshold. As the threshold used in this case, a value corresponding to the quality class into which the first value is classified is selected. If the value obtained by the above subtraction is smaller than the threshold, no handover is performed. If this value is equal to or larger than the threshold, handover is performed.

Figures 3, 4:
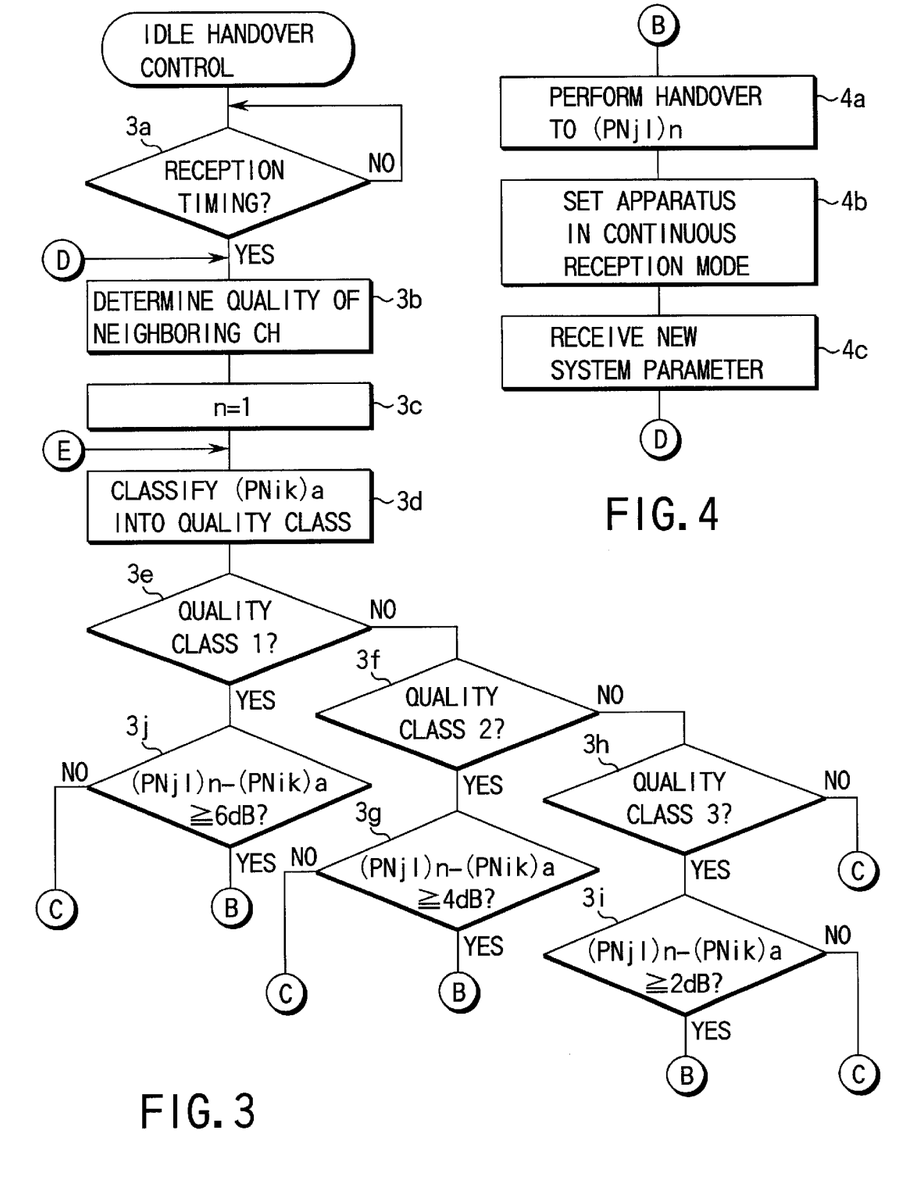
FIG. 3 is a flow chart showing the main part of an idle handover control procedure and contents.
FIG. 4 is a flow chart of another part of the idle handover control procedure and contents.
Figure 5:
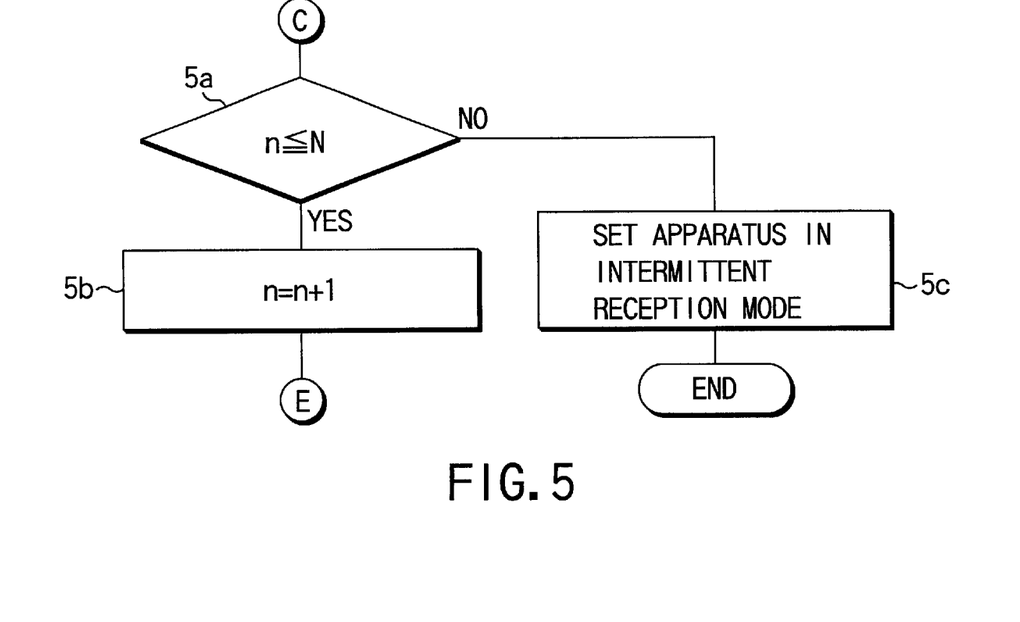
FIG. 5 is a flow chart of still another part of the idle handover control procedure and contents.

The operation associated with handover in the mobile terminal apparatus MS having the above arrangement will be described next. FIGS. 3 to 5 are flow charts showing the control procedure for this operation and the contents of control.

The mobile terminal apparatus MS performs intermittent receiving operation during standby. During this intermittent receiving operation, the microprocessor 13 checks in step 3a whether the reception timing of the self-apparatus has come. For example, the microprocessor 13 checks whether one of timings T11, T12, . . . shown in FIG. 8 has come. First of all, the microprocessor 13 detects the reception quality of a synchronized pilot channel, and receives a system parameter broadcast over the synchronized pilot channel. On the basis of a neighbor list contained in this system parameter, the microprocessor 13 then determines the reception qualities of neighboring pilot channels designated by this neighbor list (step 3b). These reception qualities are determined by making the search receiver 23 receive desired neighboring pilot channels and loading the reception power detection data of the respective channels.

Subsequently, the microprocessor 13 selects one of the neighboring pilot channels by setting n=1 in step 3c. In step 3d, the microprocessor 13 classifies a synchronized pilot channel (PNik)a according to three quality classes in accordance with the reception quality detection data. For example, quality class "1" is set to "−10 dB or more"; quality class "2", "−10 to 12 dB"; and quality class "3", "−12 dB or less". The synchronized pilot channel (PNik)a is classified into one of the three quality classes in accordance with the reception quality detection data.

The microprocessor 13 also sets different handover conditions, i.e., thresholds, in correspondence with the above three quality classes. Each threshold is a value indicating a specific dB by which the reception quality of a pilot channel as a synchronization establishment candidate should exceed the reception quality of the synchronized pilot channel when handover is to be performed from the synchronized pilot channel to the pilot channel as a synchronization establishment candidate pilot channel. For example, 6 dB, 4 dB, and 2 dB are respectively set for quality class "1", quality class "2", and quality class "3".

Assume that the synchronized pilot channel (PNik)a is classified into quality class "1" by the above quality classification. As a consequence, the microprocessor 13 makes the flow advance from step 3e to step 3j to check whether the reception quality of a pilot channel (PNjl)n as a synchronization establishment candidate selected above is larger than that of the synchronized pilot channel (PNik)a by 6 dB or more.

For example, the microprocessor 13 computes $$(PNjl)n - (PNik)a \geq 6 \text{ dB}$$

If (PNjl)n−(PNik)a is less than 6 dB, the microprocessor 13 determines that no handover is required. The step then advances to step 5a in FIG. 5 without performing handover control.

In step 5a, the microprocessor 13 checks whether any neighboring pilot channel is left unselected. If it is determined that a pilot channel is left unselected, the microprocessor 13 increments n (n=n+1) in step 5b to select the next unselected neighboring pilot channel. The flow then returns to step 3d to repeat the determination of the necessity of handover described above. In contrast to this, if it is determined that there is no unselected neighboring pilot channel, the intermittent reception mode is restored in step 5c.

Assume that the reception quality of the selected pilot channel (PNjl)n as a synchronization establishment candidate is better than that of the synchronized pilot channel (PNik)a by 6 dB or more, i.e., (PNjl)n−(PNik)a is 6 dB or more. In this case, the microprocessor 13 determines that this pilot channel (PNjl)n as a synchronization establishment candidate is suitable for handover. The flow then advances to step 4a in FIG. 4. In step 4a, the microprocessor 13 performs processing for handover from the synchronized pilot channel (PNik)a to the pilot channel (PNjl)n as a synchronization establishment candidate.

When this handover processing is over, the microprocessor 13 sets the self-apparatus in the continuous reception mode in step 4b. In step 4c, the microprocessor 13 receives a system parameter broadcast by a base station through the pilot channel (PNjl)n with which synchronization has been newly established by the above handover. The flow advances to step 3b. By the control procedure following step 3b, the microprocessor 13 checks whether handover needs to be performed again with respect to the newly synchronized pilot channel (PNjl)n. That is, the microprocessor 13 executes re-maintenance processing for the synchronized pilot channel. If this determination indicates that no handover is required, the microprocessor 13 restores the operation mode of the apparatus to the intermittent reception mode in step 5c in FIG. 5, and terminates the idle handover control.

Note that quality class "1" is set to a high reception quality with which no handover is essentially required. If, therefore, the synchronized pilot channel (PNik)a is classified into quality class "1", the microprocessor 13 may determine that no handover is required, and immediately terminate the handover control.

Assume that the synchronized pilot channel (PNik)a is not classified into quality class "1" but is classified into quality class "2". In this case, the microprocessor 13 makes the flow advance from step 3f to step 3g. In step 3g, the microprocessor 13 checks whether the reception quality of the selected pilot channel (PNjl)n as a synchronization establishment candidate is higher than that of the synchronized pilot channel (PNik)a by 4 dB or more.

For example, the microprocessor 13 computes $$(PNjl)n-(PNik)a \geq 4 \text{ dB}$$

If (PNjl)n–(PNik)a is less than 6 dB, the microprocessor 13 determines that there is no neighboring pilot channel suitable for handover. The flow then advances to step 5a in FIG. 5 without handover processing.

In step 5a, the microprocessor 13 checks whether any neighboring pilot channel is left unselected. If it is determined that a pilot channel is left unselected, the microprocessor 13 increments n (n=n+1) to select the next unselected neighboring pilot channel in step 5b. The flow then returns to step 3d to repeat the above determination of the necessity of handover. In contrast to this, if there is no unselected neighboring pilot channel, the intermittent reception mode is restored in step 5c.

Assume that the reception quality of the selected pilot channel (PNjl)n as a synchronization establishment candidate is higher than that of the synchronized pilot channel (PNik)a by 4 dB or more, i.e., (PNjl)n–(PNik)a is 4 dB or more. In this case, the microprocessor 13 determines that this pilot channel (PNjl)n as a synchronization establishment candidate is suitable for handover, and makes the flow shift to step 4a in FIG. 4. In step 4a, the microprocessor 13 performs processing for handover from the synchronized pilot channel (PNik)a to the pilot channel (PNjl)n as a synchronization establishment candidate.

When this handover processing is over, the microprocessor 13 sets the self-apparatus in the continuous reception mode in step 4b. In step 4c, the microprocessor 13 receives a system parameter broadcast by a base station over the pilot channel (PNjl)n with which synchronization has been newly established by the above handover. The flow then advances to step 3b. By the control procedure following step 3b, the microprocessor 13 performs re-maintenance for the newly synchronized pilot channel (PNjl)n. If it is determined by this re-maintenance processing that no handover is required again, the microprocessor 13 restores the operation mode of the apparatus to the intermittent reception mode in step 5c in FIG. 5, and terminates the idle handover control.

Assume that the synchronized pilot channel (PNik)a is classified into neither quality class "1" nor quality class "2" but is classified into quality class "3". In this case, the microprocessor 13 makes the flow advance from step 3h to step 3i. In step 3i, the microprocessor 13 checks whether the reception quality of the selected pilot channel (PNjl)n as a synchronization establishment candidate is higher than that of the synchronized pilot channel (PNik)a by 2 dB or more.

For example, the microprocessor 13 computes $$(PNjl)n-(PNik)a \geq 2 \text{ dB}$$

If (PNjl)n–(PNik)a is less than 2 dB, the microprocessor 13 determines that handover is not appropriate because the reception quality of the pilot channel (PNjl)n as a synchronization establishment candidate is not sufficient. The flow then advances to step 5a in FIG. 5 without handover control.

In contrast to this, assume that the reception quality of the selected pilot channel (PNjl)n as a synchronization establishment candidate is higher than that of the synchronized pilot channel (PNik)a by 2 dB or more. In this case, the microprocessor 13 determines that the pilot channel (PNjl)n as a synchronization establishment candidate is suitable for handover. The flow then advances to step 4a to execute handover from the synchronized pilot channel (PNik)a to the pilot channel (PNjl)n as a synchronization establishment candidate.

Note that after this handover processing, the microprocessor 13 receives a new system parameter over the pilot channel (PNjl)n, and performs re-maintenance processing on the basis of the neighbor list message contained in the system parameter. This operation is the same as that described above.

As described above, in the first embodiment, in idle handover control, the reception quality of a synchronized pilot channel is classified into one of quality class "1" with which data can be received without any error, quality class "2" with which data can be received within an allowable error range, and quality class "3" with which data is difficult to receive with high quality. In addition, different thresholds, i.e., 6 dB, 4 dB, and 2 dB, are respectively set for these quality classes.

It is then checked whether the reception quality of another pilot channel as a synchronization establishment candidate is higher than that of a synchronized pilot channel by the threshold corresponding to the quality class into which the synchronized pilot channel is classified or more. Only when it is determined that the reception quality of the synchronization establishment candidate is equal to or higher than the threshold, handover processing is performed. Otherwise, no handover processing is performed, and the synchronization state for the synchronized pilot channel is held.

According to the first embodiment, therefore, no handover is performed when handover is not essentially necessary. As a consequence, the power consumption for handover processing decreases, and the battery life can be prolonged accordingly.

In a conventional apparatus designed to determine the necessity of handover under a predetermined determination condition without giving no consideration to the reception quality of a synchronized pilot channel, even if the reception quality of the synchronized pilot channel is good, and handover is not essentially necessary, handover is frequently performed, resulting in large power consumption. As a consequence, the battery life is shortened.

Figure 8:
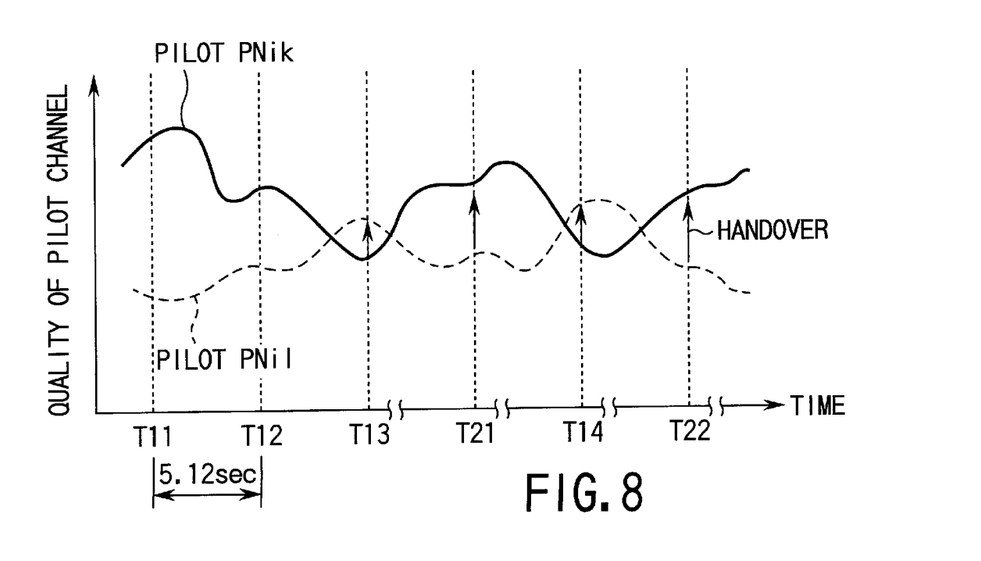
FIG. 8 is a graph for explaining the operation of idle handover in the prior art.

FIG. 8 shows an example of the operation. During standby, the mobile terminal apparatus compares a reception quality PNik of a synchronized pilot channel with a reception quality PNjl of another pilot channel as a synchronization establishment candidate at each of the reception timings T11, T12, . . . . If the reception quality of the pilot channel as a synchronization establishment candidate is higher than that of the synchronized pilot channel by about 2 dB, handover is performed unconditionally. For this reason, as shown in FIG. 8, if there are a plurality of pilot channels with similar reception qualities, and the relationship in magnitude between the reception qualities frequently changes, handover is performed at every reception timing, resulting in large power consumption. This shortens the battery life.

(Second Embodiment)

In the second embodiment of the present invention, with the idle handover control function, after handover processing, the operation mode directly shifts to the intermittent reception mode without performing re-maintenance processing for the pilot channel with which synchronization has been newly established by this handover.

Figure 6:
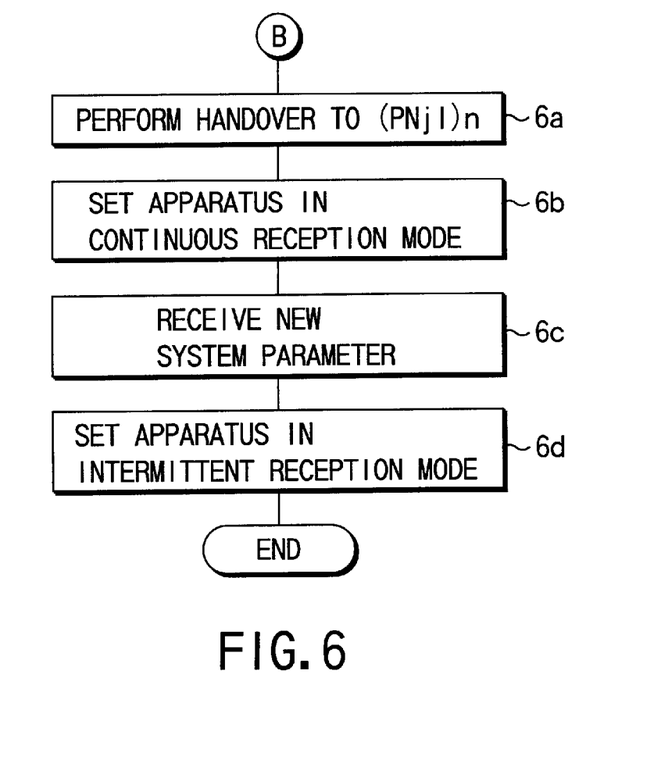
FIG. 6 is a flow chart showing the main part of an idle handover control procedure and contents according to the second embodiment of the present invention.

FIG. 6 is a flow chart showing the main part of an idle handover control procedure according to the second embodiment. Note that other parts of the idle handover control are the same as those described in the first embodiment, and hence a description thereof will be omitted.

Referring to FIG. 6, upon completing handover from a synchronized pilot channel (PNik)a to a pilot channel (PNjl)n as a synchronization establishment candidate in step 6a, a microprocessor 13 sets the self-apparatus in the continuous reception mode in step 6b. In step 6c, the microprocessor 13 receives a system parameter broadcast by a base station over the pilot channel (PNjl)n with which synchronization has been newly established by the above handover. Upon completion of the reception of this system parameter, the operation mode directly shifts to the intermittent reception mode in step 6d, and the handover control is complete.

According to the second embodiment, therefore, re-maintenance processing for the newly synchronized pilot channel (PNjl)n is omitted. Accordingly, the power consumption decreases to prolong the battery life.

When re-maintenance processing for the newly synchronized pilot channel (PNjl)n is to be omitted, a certain condition may be set.

Figure 7:
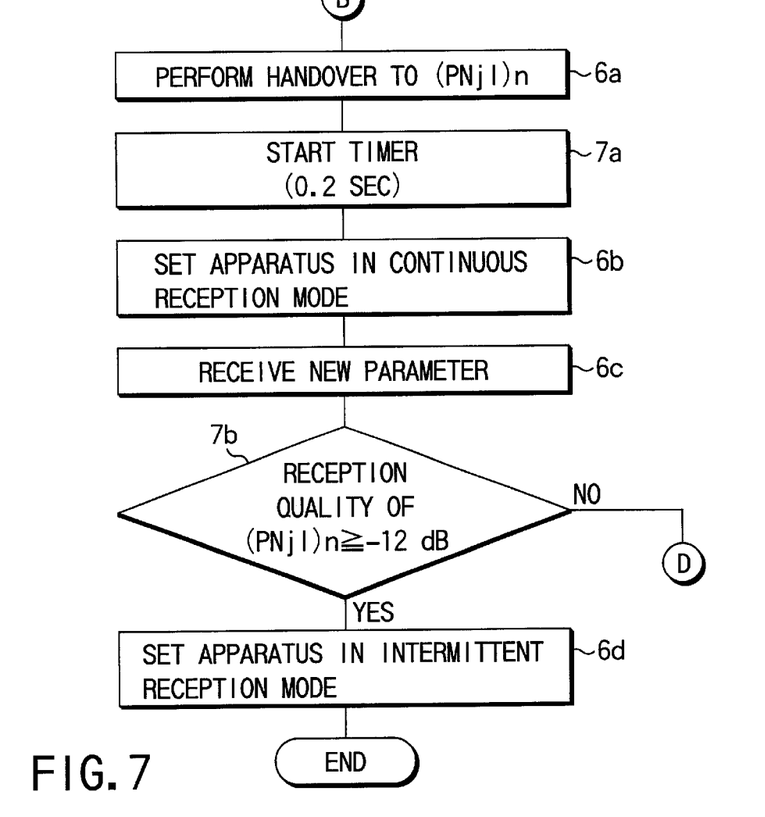
FIG. 7 is a flow chart showing the main part of an idle handover control procedure and contents according to the third embodiment of the present invention.

For example, as shown in FIG. 7, upon receiving a system parameter broadcast by a base station over the pilot channel (PNjl)n with which synchronization has been newly established by handover processing in step 6c, the microprocessor 13 makes the flow advance to step 7b. In step 7b, the microprocessor 13 checks whether the reception quality of the neighboring pilot channel (PNjl)n detected in step 3b before handover is equal to or higher than a predetermined level, e.g., −12 dB.

If the reception quality of the pilot channel (PNjl)n is −12 dB or more, the microprocessor 13 determines that handover to another pilot channel is not necessary, and omits re-maintenance processing. In contrast to this, if the reception quality of the pilot channel (PNjl)n is less than −12 dB, the microprocessor 13 determines that handover may be performed again. The flow then returns to step 3b in FIG. 3 to perform re-maintenance processing.

With this arrangement, if the reception quality of the pilot channel (PNjl)n with which synchronization has been newly established by handover has deteriorated, re-maintenance processing can be performed. With this processing, if there is another neighboring pilot channel with better reception quality, re-handover to this neighboring pilot channel can be immediately performed.

Note that re-handover to another pilot channel after the above re-maintenance processing is performed at least 0.2 sec after handover to the above pilot channel (PNjl)n. This period of 0.2 sec is counted by the soft timer of the microprocessor 13. This soft timer is started in step 7a.

With this arrangement, when the reception qualities of a synchronized pilot channel and pilot channels as synchronization establishment candidates are similar and low, frequent re-handover among these pilot channels at short time intervals can be suppressed. This makes it possible to reduce the power consumed by re-handover and prolong the battery life.

(Third Embodiment)

According to the third embodiment of the present invention, in the neighboring pilot channel reception quality detection processing in step 3b in FIG. 3, history information about the reception quality of each of a plurality of pilot channels as synchronization establishment candidates is managed. Some of pilot channels are selected from the plurality of pilot channels as synchronization establishment candidates on the basis of this history information, and the reception qualities of only the selected signals are detected.

With this arrangement, pilot channels whose reception qualities are to be detected are thinned out. Therefore, the power consumption required for reception quality detection processing can be reduced as compared with the case wherein the reception qualities of all the pilot channels designated by the neighbor list are detected. This makes it possible to prolong the battery life. In addition, even though pilot channels whose reception qualities are to be detected are thinned out, the reception qualities of stable signals as synchronization establishment candidates can always be detected.

(Other Embodiments)

In each embodiment described above, a synchronized pilot channel is classified according to a plurality of quality classes on the basis of the reception quality, and the necessity of handover is determined by using a threshold set for each quality class. However, the present invention is not limited to this. For example, table data may be prepared, which indicates the correspondence between the reception quality of each synchronized pilot channel and a corresponding threshold. The detected reception quality value of the synchronized pilot channel is given as an address to the table data to read a threshold corresponding to the above detected reception quality value from the table data. The necessity of handover may be determined by using this threshold.

In addition, instead of using the table data described above, a mathematical expression representing the correspondence between the reception quality of each synchronized pilot channel and a corresponding threshold may be stored, and a threshold corresponding to the above detected reception quality value may be obtained from the detected reception quality value of the synchronized pilot channel and the mathematical expression.

The present invention is not limited to the respective embodiments described above, and various changes and modifications can be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A CDMA mobile terminal apparatus having a function of receiving signals respectively transmitted from a plurality of base stations, selecting an optimal one of the signals, and establishing synchronization with the optimal one of the signals, comprising:

a first detector configured to detect a reception quality of a first signal with which synchronization is established;

a second detector configured to detect a reception quality of at least one second signal as a synchronization establishment candidate;

a reference value determination section configured to obtain a determination reference value corresponding to the reception quality of the first signal detected by the first detector, on the basis of information representing a relationship between a reception quality and a determination reference value;

a determination section configured to determine whether or not the reception quality of the second signal detected by the second detector is higher than the reception quality of the first signal detected by the first detector by the determination reference value obtained by the reference value determination section;

a switching controller configured to switch a signal as a synchronization establishment target from the first signal to the second signal, when the determination section determines that the reception quality of the second signal detected by the second detector is higher than the reception quality of the first signal detected by the first detector by the determination reference value obtained by the reference value determination section; and an inhibiting controller configured to inhibit, when the switching controller switches the signal as the synchronization establishment target from the first signal to the second signal, a processing for determining the reception quality of the second signal and a processing for determining whether or not to switch the signal from the second signal to a third signal, until an intermittent reception mode is set after the synchronization with the second signal is established.

2. A CDMA mobile terminal apparatus having a function of receiving signals respectively transmitted from a plurality of base stations, selecting an optimal one of the signals, and establishing synchronization with the optimal one of the signals, comprising:

a first detector configured to detect a reception quality of a first signal with which synchronization is established;

a second detector configured to detect a reception quality of at least one second signal as a synchronization establishment candidate;

a classification section configured to select one of a plurality of quality classes which are determined in advance, to which the reception quality of the first signal detected by the first detector belongs;

a selection section configured to select one of a plurality of determination reference values respectively corresponding to the plurality of quality classes, as a determination reference value corresponding to the reception quality of the first signal detected by the first detector;

a determination section configured to determine whether or not the reception quality of the second signal detected by the second detector is higher than the reception quality of the first signal detected by the first detector by said selected one of the plurality of determination reference values;

a switching controller configured to switch a signal as a synchronization establishment target from the first signal to the second signal, when the determination section determines that the reception quality of the second signal detected by the second detector is higher than the reception quality of the first signal detected by the first detector by said selected one of the plurality of determination reference values, and an inhibiting controller configured to inhibit, when the switching controller switches the signal as the synchronization establishment target from the first signal to the second signal, a processing for determining the reception quality of the second signal and a processing for determining whether or not to switch the signal as the synchronization establishment target from the second signal to the third signal, until an intermittent reception mode is set after the synchronization with the second signal is established.

3. A CDMA mobile terminal apparatus having a function of receiving signals respectively transmitted from a plurality of base stations, selecting an optimal one of the signals, and establishing synchronization with the optimal one of the signals, comprising;

a first detector configured to detect a reception quality of a first signal with which synchronization is established;

a second detector configured to detect a reception quality of at least one second signal as a synchronization establishment candidate;

a reference value determination section configured to obtain a determination reference value corresponding to the reception quality of the first signal detected by the first detector, on the basis of information representing a relationship between the reception quality of the first signal detected by the first detector and a determination reference value;

a first determination section configured to determine whether or not the reception quality of the second signal detected by the second detector is higher than the detected reception quality of the first signal by the obtained determination reference value;

a first switching controller configured to switch a signal as a synchronization establishment target from the first signal to the second signal, when the first determination section determines that the reception quality of the second signal detected by the second detector is higher than the reception quality of the first signal detected by the first detector by the determination reference value obtained by the reference value determination section;

a second determination section configured to determine whether or not the reception quality of the second signal is equal to or higher than a predetermined value, in a time period in which an intermittent reception mode is set after synchronization with the second signal is established, when the first switching controller switches the signal as the synchronization establishment target from the first signal to the second signal;

a third determination section configured to determine whether or not to switch the signal as the synchronization establishment target from the second signal to a third signal, when the second determination section determines that the reception quality of the second signal detected by the second determination section is lower then the predetermined value;

an inhibiting controller configured to inhibit determination by the third determination section, when the second determination section determines that the reception quality of the second signal is equal to or higher than the predetermined value; and a second switching controller configured to switch the signal as the synchronization establishment target from the second signal to the third signal, after at least a predetermined time period lapses from when the signal as the synchronization establishment target is switched from the first signal to the second signal, when the third determination section determines to switch the signal as the synchronization establishment target from the second signal to the third signal.

4. A CDMA mobile terminal apparatus having a function of receiving signals respectively transmitted from a plurality of base stations, selecting an optimal one of the signals, and establishing synchronization with the optimal one of the signals, comprising:

a first detector configured to detect a reception quality of a first signal with which synchronization is established;

a second detector configured to detect a reception quality of at least one second signal as a synchronization establishment candidate;

a classification section configured to select one of a plurality of quality classes, which are determined in advance, to which the reception quality of the first signal detected by the first detector belongs;

a selection section configured to select one of a plurality of determination reference values respectively corresponding to the plurality of quality classes, as a determination reference value corresponding to the reception quality of the first signal detected by the first detector;

a first determination section configured to determine whether or not the reception quality of the second signal detected by the second detector is higher than the reception quality of the first signal detected by the first detector by said selected one of the plurality of determination reference values;

a first switching controller configured to switch a signal as a synchronization establishment target from the first signal to the second signal, when the first determination section determines that the reception quality of the second signal detected by the second detector is higher than the reception quality of the first signal detected by the first detector by said selected one of the plurality of determination reference values;

a second determination section configured to determine whether or not the reception quality of the second signal is equal to or higher than a predetermined value, in a time period in which an intermittent reception mode is set after synchronization with the second signal is established, when the first switching controller switches the signal as the synchronization establishment target from the first signal to the second signal;

a third determination section configured to determine whether or not to switch the signal as the synchronization establishment target from the second signal to a third signal, when the second determination section determines that the reception quality of the second signal detected by the second determination section is lower then the predetermined value;

an inhibiting controller configured to inhibit determination by the third determination section, when the second determination section determines that the reception quality of the second signal is equal to or higher than the predetermined value; and a second switching controller configured to switch the signal as the synchronization establishment target from the second signal to the third signal, after at least a predetermined time period lapses from when the signal as the synchronization establishment target is switched from the first signal to the second signal, when the third determination section determines to switch the signal as the synchronization establishment target from the second signal to the third signal.

5. A CDMA mobile terminal apparatus having a function of receiving signals respectively transmitted from a plurality of base stations, selecting an optimal one of the signals, and establishing synchronization with the optimal one of the signals, comprising:

a first detector configured to detect a reception quality of a first signal with which synchronization is established;

a second detector configured to detect a reception quality of at least one second signal as a synchronization establishment candidate;

a reference value determination section configured to obtain a determination reference value corresponding to the reception quality of the first signal detected by the first detector, on the basis of information representing a relationship between the reception quality of the first signal detected by the first detector and a determination reference value;

a first determination section configured to determine whether or not the reception quality of the second signal detected by the second detector is higher than the reception quality of the first signal detected by the first detector by the determination reference value obtained by the reference value determination section;

a first switching controller configured to switch a signal as a synchronization establishment target from the first signal to the second signal, when the first determination section determines that the reception quality of the second signal detected by the second detector is higher than the reception quality of the first signal detected by the first detector by the determination reference value obtained by the reference value determination section;

a second determination section configured to determine whether or not to switch the signal as the synchronization establishment target from the second signal to a third signal, in a time period in which an intermittent reception mode is set after synchronization with the second signal is established, when the first switching controller switches the signal as the synchronization establishment target from the first signal to the second signal; and a second switching controller configured to switch the signal as the synchronization establishment target from the second signal to the third signal, after at least a predetermined time period lapses from when the signal as the synchronization establishment target is switched from the first signal to the second signal, when the second determination section determines to switch the signal as the synchronization establishment target from the second signal to the third signal.

6. A CDMA mobile terminal apparatus having a function of receiving signals respectively transmitted from a plurality of base stations, selecting an optimal one of the signals, and establishing synchronization with the optimal one of the signals, comprising:

a first detector configured to detect a reception quality of a first signal with which synchronization is established;

a second detector configured to detect a reception quality of at least one second signal as a synchronization establishment candidate;

a classification section configured to select one of a plurality of quality classes which are determined in advance, to which the reception quality of the first signal detected by the first detector belongs;

a selection section configured to select one of a plurality of determination reference values respectively corresponding to the plurality of quality classes, as a determination reference value corresponding to the reception quality of the first signal detected by the first detector;

a first determination section configured to determine whether or not the reception quality of the second signal detected by the second detector is equal or higher than the reception quality of the first signal detected by the first detector by said selected one of the plurality of determination reference values;

a first switching controller configured to switch a signal as a synchronization establishment target from the first signal to the second signal, when the first determination section determines that the reception quality of the second signal detected by the second detector is higher than the reception quality of the first signal detected by the first detector by said selected one of the plurality of determination reference values;

a second determination section configured to determine whether or not to switch the signal as the synchronization establishment target from the second signal to a third signal, in a time period in which an intermittent reception mode is set after synchronization with the second signal is established, when the first switching controller switches the signal as the synchronization establishment target from the first signal to the second signal; and a second switching controller configured to switch the signal as the synchronization establishment target from the second signal to the third signal, after at least a predetermined time period lapses from when the signal as the synchronization establishment target is switched from the first signal to the second signal, when the second determination section determines to switch the signal as the synchronization establishment target from the second signal to the third signal.

7. A hand-over controlling method for a CDMA mobile terminal apparatus having a function of receiving signals respectively transmitted from a plurality of base stations, selecting an optimal one of the signals, and establishing synchronization with the optimal one of the signals, comprising:

detecting a reception quality of a first signal with which synchronization is established;

detecting a reception quality of at least one second signal as a synchronization establishment candidate;

obtaining a determination reference value corresponding to the detected reception quality of the first signal, on the basis of information representing a relationship between a reception quality and a determination reference value;

determining whether or not the detected reception quality of the second signal is higher than the detected reception quality of the first signal by the obtained determination reference value;

switching a signal as a synchronization establishment target from the first signal to the second signal, when it is determined that the reception quality of the second signal is higher than the reception quality of the first signal by the determination reference value; and inhibiting, when the signal as the synchronization establishment target is switched from the first signal to the second signal, a processing for determining the reception quality of the second signal and a processing for determining whether or not to switch the signal from the second signal to a third signal, until an intermittent reception mode is set after the synchronization with the second signal is established.

8. A hand-over controlling method for a CDMA mobile terminal apparatus having a function of receiving signals respectively transmitted from a plurality of base stations, selecting an optimal one of the signals, and establishing synchronization with the optimal one of the signals, comprising:

detecting a reception quality of a first signal with which synchronization is established;

detecting a reception quality of at least one second signal as a synchronization establishment candidate;

selecting on of a plurality of quality classes which are determined in advance, to which the detected reception quality of the first signal belongs;

selecting one of a plurality of determination reference values respectively corresponding to the plurality of quality classes, as a determination reference value corresponding to the detected reception quality of the first signal;

determining whether or not the detected reception quality of the second signal is higher than the detected reception quality of the first signal by said selected one of the plurality of determination reference values;

switching a signal as a synchronization establishment target from the first signal to the second signal, when it is determined that the detected reception quality of the second signal is higher than the detected reception quality of the first signal by said selected one of the plurality of determination reference values; and inhibiting, when the signal as the synchronization establishment target is switched from the first signal to the second signal, a processing for determining the reception quality of the second signal and a processing for determining whether or not to switch the signal as the synchronization establishment target from the second signal to a third signal, until an intermittent reception mode is set after the synchronization with the second signal is established.

9. A hand-over controlling method for a CDMA mobile terminal apparatus having a function of receiving signals respectively transmitted from a plurality of base stations, selecting an optimal one of the signals, and establishing synchronization with the optimal one of the signals, comprising:

detecting a reception quality of a first signal with which synchronization is established;

detecting a reception quality of at least one second signal as a synchronization establishment candidate;

obtaining a determination reference value corresponding to the detected reception quality of the first signal, on the basis of information representing a relationship between the detected reception quality of the first signal and a determination reference value;

determining whether or not the detected reception quality of the second signal is higher than the detected reception quality of the first signal by the obtained determination reference value;

switching a signal as a synchronization establishment target from the first signal to the second signal, when it is determined that the detected reception quality of the second signal is higher than the detected reception quality of the first signal by the obtained determination reference value;

determining whether or not the detected reception quality of the second signal is equal to or higher than a predetermined value, in a time period in which an intermittent reception mode is set after synchronization with the second signal is established, when the signal as the synchronization establishment target is switched from the first signal to the second signal, determining whether or not to switch the signal as the synchronization establishment target from the second signal to a third signal, when it is determined that the detected reception quality of the second signal is lower than the predetermined valve;

inhibiting determination by the third determination section, when it is determined that the reception quality of the second signal is equal to or higher than the predetermined value; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to the third signal.

10. A hand-over controlling method for a CDMA mobile terminal apparatus having a function of receiving signals respectively transmitted from a plurality of base stations, selecting an optimal one of the signals, and establishing synchronization with the optimal one of the signals, comprising detecting a reception quality of a first signal with which synchronization is established, detecting a reception quality of at least one second signal as a synchronization establishment candidate, selecting one of a plurality of quality classes which are determined in advance, to which the detected reception quality of the first signal belongs;

selecting one of a plurality of determination reference values respectively corresponding to the plurality of quality classes, as a determination reference value corresponding to the detected reception quality of the first signal;

determining whether or not the detected reception quality of the second signal is higher then the detected reception quality of the first signal by said selected one of the plurality of determination reference values;

switching a signal as a synchronization establishment target from the first signal to the second signal, when it is determined that the detected reception quality of the second signal is higher than the detected reception quality of the first signal by said selected one of the plurality of determination reference values;

determining whether or not the reception quality of the second signal is equal to or higher than a predetermined value, in a time period in which an intermittent reception mode is set after synchronization with the second signal is established, when the signal as the synchronization establishment target is switched from the first signal to the second signal;

determining whether or not to switch the signal as the synchronization establishment target from the second signal to a third signal, when it is determined that the detected reception quality of the second signal is lower than the predetermined value;

inhibiting determination by the third determination section, when it is determined that the reception quality of the second signal is equal to or higher than the predetermined value; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to the third signal.

11. A hand-over controlling method for a CDMA mobile terminal apparatus having a function of receiving signals respectively transmitted from a plurality of base stations, selecting an optimal one of the signals, and establishing synchronization with the optimal one of the signals, comprising detecting a reception quality of a first signal with which synchronization is established;

detecting a reception quality of at least one second signal as a synchronization establishment candidate, obtaining a determination reference value corresponding to the detected reception quality of the first signal, on the basis of information representing a relationship between the detected reception quality of the first signal and a determination reference value, determining whether or not the detected reception quality of the second signal is higher then the detected reception quality of the first signal by the obtained determination reference value, switching a signal as a synchronization establishment target from the first signal to the second signal, when it is determined that the detected reception quality of the second signal is higher then the detected reception quality of the first signal by the determination reference value;

determining whether or not to switch the signal as the synchronization establishment target from the second signal to a third signal, in a time period in which an intermittent reception mode is set after synchronization with the second signal is established, when the signal as the synchronization establishment target is switched from the first signal to the second signal; and switching the signal as the synchronization establishment target from the second signal to the third signal, after at least a predetermined time period lapses from time at when the signal as the synchronization establishment target is switched from the first signal to the second signal, when it is determined to switch the signal as the synchronization establishment target from the second signal to the third signal.

12. A hand-over controlling method for a CDMA mobile terminal apparatus having a function of receiving signals respectively transmitted from a plurality of base stations, selecting an optimal one of the signals, and establishing synchronization with the optimal one of the signals, comprising detecting a reception quality of a first signal with which synchronization is established;

detecting a reception quality of at least one second signal as a synchronization establishment candidate;

selecting one of a plurality of quality classes which are determined in advance, to which the detected reception quality of the first signal belongs;

selecting one of a plurality of determination reference values respectively corresponding to the plurality of quality classes, as a determination reference value corresponding to the detected reception quality of the first signal;

determining whether or not the detected reception quality of the second signal is equal or higher than the detected reception quality of the first signal by said selected one of the plurality of determination reference values;

switching a signal as a synchronization establishment target from the first signal to the second signal, when it is determined that the detected reception quality of the second signal is higher then the detected reception quality of the first signal by said selected one of the plurality of determination reference values, determining whether or not to switch the signal as the synchronization establishment target from the second signal to a third signal, in a time period in which an intermittent reception mode is set after synchronization with the second signal is established, when the signal as the synchronization establishment target is switched from the first signal to the second signal; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to the third signal.

13. A computer program for use in a CDMA mobile terminal apparatus having a function of receiving signals respectively transmitted from a plurality of base stations, selecting an optimal one of the signals, and establishing synchronization with the optimal one of the signals, said computer program capable of performing a method comprising:

detecting a reception quality of a first signal with which synchronization is established;

detecting a reception quality of at least one second signal as a synchronization establishment candidate;

obtaining a determination reference value corresponding to the detected reception quality of the first signal, on the basis of information representing a relationship between a reception quality and a determination reference value;

determining whether or not the detected reception quality of the second signal is higher than the detected reception quality of the first signal by the obtained determination reference value;

switching a signal as a synchronization establishment target from the first signal to the second signal, when it is determined that the reception quality of the second signal is higher then the reception quality of the first signal by the determination reference value, and inhibiting, when the signal as the synchronization establishment target is switched from the first signal to the second signal, a processing for determining the reception quality of the second signal and a processing for determining whether or not to switch the signal from the second signal to a third signal, until an intermittent reception mode is set after the synchronization with the second signal is established.

14. A computer program for use in a CDMA mobile terminal apparatus having a function of receiving signals respectively transmitted from a plurality of base stations, selecting an optimal one of the signals, and establishing synchronization with the optimal one of the signals, said computer program capable of performing a method comprising:

detecting a reception quality of a first signal with which synchronization is established;

detecting a reception quality of at least one second signal as a synchronization establishment candidate;

selecting one of a plurality of quality classes which are determined in advance, to which the detected reception quality of the first signal belongs, selecting one of a plurality of determination reference values respectively corresponding to the plurality of quality classes as a determination reference value corresponding to the detected reception quality of the first signal, determining whether or not the detected reception quality of the second signal is higher than the detected reception quality of the first signal by said selected one of the plurality of determination reference values;

switching a signal as a synchronization establishment target from the first signal to the second signal, when it is determined that the detected reception quality of the second signal is higher than the detected reception quality of the first signal by said selected one of the plurality of determination reference values; and inhibiting, when the signal as the synchronization establishment target is switched from the first signal to the second signal, a processing for determining the reception quality of the second signal and a processing for determining whether or not to switch the signal as the synchronization establishment target from the second signal to a third signal, until an intermittent reception mode is set after the synchronization with the second signal is established.

15. A computer program for use in a CDMA mobile terminal apparatus having a function of receiving signals respectively transmitted from a plurality of base stations, selecting an optimal one of the signals, and establishing synchronization with the optimal one of the signals, said computer program capable of performing a method comprising;

detecting a reception quality of a first signal with which synchronization is established;

detecting a reception quality of at least one second signal as a synchronization establishment candidate;

obtaining a determination reference value corresponding to the detected reception quality of the first signal, on the basis or information representing a relationship between the detected reception quality of the first signal and a determination reference value;

determining whether or not the detected reception quality of the second signal is higher than the detected reception quality of the first signal by the obtained determination reference value;

switching a signal as a synchronization establishment target from the first signal to the second signal, when it is determined that the detected reception quality of the second signal is higher than the detected reception quality of the first signal by the obtained determination reference value;

determining whether or not the detected reception quality of the second signal is equal to or higher than a predetermined value, in a time period in which an intermittent reception mode is set after synchronization with the second signal is established, when the signal as the synchronization establishment target is switched from the first signal to the second signal;

determining whether or not to switch the signal as the synchronization establishment target from the second signal to a third signal, when it is determined that the detected reception quality of the second signal is lower than the predetermined value, inhibiting determination by the third determination section, when it is determined that the reception quality of the second signal is equal to or higher than the predetermined value; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to the third signal.

16. A computer program for use in a CDMA mobile terminal apparatus having a function of receiving signals respectively transmitted from a plurality of base stations, selecting an optimal one of the signals, and establishing synchronization with the optimal one of the signals, said computer program capable of performing a method comprising detecting a reception quality of a first signal with which synchronization is established;

detecting a reception quality of at least one second signal as a synchronization establishment candidate;

selecting one of a plurality of quality classes which are determined in advance, to which the detected reception quality of the first signal belongs;

selecting one of a plurality of determination reference values respectively corresponding to the plurality of quality classes, as a determination reference value corresponding to the detected reception quality of the first signal;

determining whether or not the detected reception quality of the second signal is higher than the detected reception quality of the first signal by said selected one of the plurality of determination reference values;

switching a signal as a synchronization establishment target from the first signal to the second signal, when it is determined that the detected reception quality of the second signal is higher than the detected reception quality of the first signal by said selected one of the plurality of determination reference values;

determining whether or not the reception quality of the second signal is equal to or higher then a predetermined value, in a time period in which an intermittent reception mode is set after synchronization with the second signal is established, when the signal as the synchronization establishment target is switched from the first signal to the second signal;

determining whether or not to switch the signal as the synchronization establishment target from the second signal to a third signal, when it is determined that the detected reception quality of the second signal is lower then the predetermined value;

inhibiting determination by the third determination section, when it is determined that the reception quality of the second signal is equal to or higher than the predetermined value; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to this third signal.

17. A computer program for use in a CDMA mobile terminal apparatus having a function of receiving signals respectively transmitted from a plurality of base stations, selecting an optimal one of the signals, and establishing synchronization with the optimal one of the signals, said computer program capable of performing a method comprising:

detecting a reception quality of a first signal with which synchronization is established, detecting a reception quality of at least one second signal as a synchronization establishment candidate;

obtaining a determination reference value corresponding to the detected reception quality of the first signal, on the basis of information representing a relationship between the detected reception quality of the first signal and a determination reference value;

determining whether or not the detected reception quality of the second signal is higher than the detected reception quality of the first signal by the obtained determination reference value;

switching a signal as a synchronization establishment target from the first signal to the second signal, when it is determined that the detected reception quality of the second signal is higher than the detected reception quality of the first signal by the determination reference value;

determining whether or not to switch the signal as the synchronization establishment target from the second signal to a third signal, in a time period in which an intermittent reception mode is set after synchronization with the second signal is established, when the signal as the synchronization establishment target is switched from the first signal to the second signal; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to the third signal.

18. A computer program for use in a CDMA mobile terminal apparatus having a function of receiving signals respectively transmitted from a plurality of base stations, selecting an optimal one of the signals, and establishing synchronization with the optimal one of the signals, said computer program capable of performing a method comprising:

detecting a reception quality of a first signal with which synchronization is established;

detecting a reception quality of at least one second signal as a synchronization establishment candidate;

selecting one of a plurality of quality classes which are determined in advance, to which the detected reception quality of the first signal belongs;

selecting one of a plurality of determination reference values respectively corresponding to the plurality of quality classes, as a determination reference value corresponding to the detected reception quality of the first signal;

determining whether or not the detected reception quality of the second signal is equal or higher than the detected reception quality of the first signal by said selected one of the plurality of determination reference values;

switching a signal as a synchronization establishment target from the first signal to the second signal, when it is determined the detected reception quality of the second signal is higher than the detected reception quality of the first signal by said selected one of the plurality of determination reference values;

determining whether or not to switch the signal as the synchronization establishment target from the second signal to a third signal, in a time period in which an intermittent reception mode is set after synchronization with the second signal is established, when the signal as the synchronization establishment target is switched from the first signal to the second signal; and switching the signal as the synchronization establishment target from the second signal to the third signal, after at least a predetermined time period lapses from when the signal as the synchronization establishment target is switched from the first signal to the second signal, when it is determined to switch the signal as the synchronization establishment target from the second signal to the third signal.

19. A mobile communication apparatus for use in a CDMA system, which includes a plurality of base stations each of which broadcasts control signals, the mobile communication apparatus receiving the control signals, selecting a first signal of the signals and synchronizing with the selected first one of the signals, the mobile communication apparatus comprising:

a first detector configured to detect a quality of the synchronized first signal;

a second detector configured to detect a quality of a second signal to be synchronized with the apparatus;

a storage section configured to store qualities and threshold values, each value corresponding to a respective one of the signal qualities;

a first determination section configured to determine one of the threshold values which corresponds to the detected quality of the received first signal, based on the stored threshold values and the stored values of the signal qualities;

a second determination section configured to determine whether the detected quality of the second signal is higher than the detected quality of the received first signal by the determined threshold value;

a changing section configured to change a signal to be synchronized, from the first signal to the second signal, if the detected quality of the second signal is higher than the detected quality of the received first signal by the determined threshold value; and a disabling section configured to disable determining the quality of the second signal and disable determining whether to change the signal to be synchronized from the second signal to a third signal, until after the mobile communication apparatus synchronizes with the second signal and terminates the synchronization with the first signal.

* * * * *

UNITED STATES PATENT AND TRADEMARK OFFICE
CERTIFICATE OF CORRECTION

PATENT NO.     : 6,556,834 B1
DATED          : April 29, 2003
INVENTOR(S)    : Kobayashi et al.

It is certified that error appears in the above-identified patent and that said Letters Patent is hereby corrected as shown below:

Column 14,
Line 56, change "lower then" to -- lower than --.

Column 15,
Line 53, change "lower then" to -- lower than --.

Column 18,
Line 14, change "selecting on" to -- selecting one --.

Column 19,
Line 12, change "valve;" to -- value; --.
Line 44, change "higher then" to -- higher than --.

Column 20,
Lines 28 and 34, change "higher then" to -- higher than --.

Column 21,
Lines 11 and 54, change "higher then" to -- higher than --

Column 22,
Line 49, change "basis or information" to -- basis of information --.

Column 23,
Line 51, change "higher then" to -- higher than --.
Lines 60-61, change "lower then" to -- lower than --.

Signed and Sealed this

Thirtieth Day of September, 2003

JAMES E. ROGAN
*Director of the United States Patent and Trademark Office*